(12) United States Patent
Kim

(10) Patent No.: US 12,124,286 B2
(45) Date of Patent: Oct. 22, 2024

(54) ELECTRONIC PEDAL APPARATUS

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/226,179

(22) Filed: Jul. 25, 2023

(65) Prior Publication Data

US 2024/0288895 A1  Aug. 29, 2024

(30) Foreign Application Priority Data

Feb. 23, 2023  (KR) .................. 10-2023-0024153

(51) Int. Cl.
*G05G 1/30* (2008.04)
*B60K 26/02* (2006.01)
*B60T 7/04* (2006.01)
*B60T 7/06* (2006.01)

(52) U.S. Cl.
CPC ........... *G05G 1/305* (2013.01); *B60K 26/021* (2013.01); *B60T 7/042* (2013.01); *B60T 7/06* (2013.01)

(58) Field of Classification Search
CPC ............ G05G 1/30; G05G 1/305; G05G 1/34; G05G 1/38; G05G 1/42; B60K 26/02; B60K 26/021; B60K 26/04; B60T 7/04; B60T 7/042; B60T 7/06
See application file for complete search history.

(56) References Cited

U.S. PATENT DOCUMENTS

| | | | | |
|---|---|---|---|---|
| 1,457,489 | A * | 6/1923 | Barton | B60W 10/04 188/106 R |
| 1,928,267 | A * | 9/1933 | Rudyk | B60T 7/04 477/211 |
| 2,542,410 | A * | 2/1951 | Hedges | B60W 10/18 74/478 |
| 2,553,080 | A * | 5/1951 | Ching, Sr. | G05G 1/305 D12/174 |
| 2,936,867 | A * | 5/1960 | Perry | B60W 10/04 74/513 |
| 2,986,953 | A * | 6/1961 | De Armond | H01C 10/14 338/153 |
| 4,120,387 | A * | 10/1978 | Otteblad | B60W 10/18 477/212 |
| 5,596,906 | A * | 1/1997 | Lin | B60K 26/02 477/214 |

(Continued)

FOREIGN PATENT DOCUMENTS

| | | | |
|---|---|---|---|
| EP | 0699141 B1 * | 12/1996 | |
| EP | 3901031 A1 * | 10/2021 | ............ B60K 26/02 |
| KR | 10-2020-0070946 | 6/2022 | |

*Primary Examiner* — Adam D Rogers
(74) *Attorney, Agent, or Firm* — Morgan, Lewis & Bockius LLP

(57) ABSTRACT

An electronic pedal apparatus includes a brake pedal module and an accelerator pedal module vertically coupled in a stacked manner to form a single one-pedal, which makes it possible to improve utilization of an internal space by implementing a compact size and prevent an erroneous operation and further improve safety at the time of operating pedals by making an operation direction of a brake pedal different from an operation direction of an accelerator pedal.

20 Claims, 23 Drawing Sheets

(56) References Cited

U.S. PATENT DOCUMENTS

| | | | | |
|---|---|---|---|---|
| 5,599,255 | A * | 2/1997 | Ki-Dong | B60W 30/18181 477/214 |
| 9,501,083 | B2 * | 11/2016 | Zhou | F02D 11/02 |
| 10,732,667 | B2 * | 8/2020 | Kim | G05G 1/01 |
| 2004/0103743 | A1 * | 6/2004 | Takenaka | G05G 1/36 74/513 |
| 2020/0101841 | A1 * | 4/2020 | Tsunemi | G05G 1/38 |

* cited by examiner

ELECTRONIC PEDAL APPARATUS

CROSS-REFERENCE TO RELATED APPLICATION

The present application claims priority to Korean Patent Application No. 10-2023-0024153, filed on Feb. 23, 2023, the entire contents of which is incorporated herein for all purposes by this reference.

BACKGROUND OF THE PRESENT DISCLOSURE

Field of the Present Disclosure

The present disclosure relates to a technology associated with an electronic pedal apparatus mounted in a vehicle and configured to generate an acceleration signal or a braking signal for a vehicle when a driver operates the electronic pedal apparatus.

Description of Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal.

In a case in which an autonomous driving situation is universally implemented, the driver may select an autonomous driving mode in which the driver does not directly drive the vehicle and the vehicle autonomously travels to the destination.

It is necessary to enable the driver to take a rest comfortably with his feet stretched in the autonomous driving mode. If pedals (an accelerator pedal and a brake pedal) positioned in a lower space of a driver seat are kept exposed to the interior of the vehicle, the pedals disturb the driver's relaxation. If a pad of a pedal device is erroneously operated regardless of the driver's intention, there is a risk that an accident occurs.

Therefore, a foldable pedal device for an autonomous vehicle is being developed, in which a pedal pad is exposed to protrude toward the driver so that the driver may operate the pad in the manual driving mode in which the driver directly drives the vehicle, and the pedal pad is hidden so as not to protrude toward the driver in the autonomous driving mode so that the pad cannot be operated by the driver, ensuring the driver's comfortable relaxation and implementing safety by preventing an erroneous operation.

However, the foldable pedal device has a drawback in that it is necessary to provide a space for hiding the pedal device in a hidden state, and an operation mechanism is also complicated, which causes increases in weight and costs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus mounted in a vehicle and configured to generate an acceleration signal or a braking signal for the vehicle when a driver operates the electronic pedal apparatus, the electronic pedal apparatus being configured to enable the driver to operate the electronic pedal apparatus with a small effort, prevent an erroneous operation by making an operation direction of a brake pedal different from an operation direction of an accelerator pedal, and maximize utilization of an internal space by providing a single one-pedal module by stacking a brake pedal module and an accelerator pedal module.

An exemplary embodiment of the present disclosure provides an electronic pedal apparatus including: a brake pedal module and an accelerator pedal module stacked and coupled to each other to form a single one-pedal, in which the one-pedal is provided on a vehicle body panel disposed below a driver seat.

The brake pedal module may be provided on the vehicle body panel, and the accelerator pedal module may be stacked and coupled to an upper side of the brake pedal module to form the single one-pedal.

An operation direction in which the brake pedal module is operated by a driver may be different from an operation direction in which the accelerator pedal module is operated by the driver.

The brake pedal module may be operated by a driver in a forward/rearward direction together with the accelerator pedal module, and the accelerator pedal module may be operated in a transverse direction when the driver operates the accelerator pedal module.

The brake pedal module may include: a base housing fixed to the vehicle body panel; a brake pedal stacked on the base housing and configured to be moved forward toward the base housing in response to a driver's operation thereof; and a brake pedal return spring including first and second opposite end portions connected to the base housing and the brake pedal, respectively and configured to return the brake pedal by moving the brake pedal in a direction, which is opposite to a direction in which the brake pedal is operated in response to the driver's operation thereof, when an operating force of the driver is removed from the brake pedal.

A first slot hole may be formed in a lateral surface of the base housing and extend in a movement direction of the brake pedal, and a first stopper may be provided on a lateral surface of the brake pedal and inserted into the first slot hole so that a movement of the brake pedal is restricted by the first slot hole and the first stopper.

The brake pedal module may include: a first permanent magnet coupled to the brake pedal; and a first printed circuit board (PCB) provided in the base housing to face the first permanent magnet and configured to detect a change in magnetic flux and generate a signal related to a pedal function when a position of the first permanent magnet is changed by a movement of the brake pedal.

The brake pedal module may further include: a pedal link rotatably coupled to the brake pedal; and an operating characteristic implementing portion fixed to the base housing and provided to be in contact with the pedal link, the operating characteristic implementing portion including concave-convex portions, which are contact portions with the pedal link, and configured to implement operating characteristics by contact between the pedal link and the concave-convex portions in response that the driver operates the brake pedal.

The pedal link may include a rotary roller disposed on a portion provided to be in contact with the concave-convex portions, any one of the rotary roller and the concave-convex portions may be configured as a magnet, the other of the rotary roller and the concave-convex portions may be configured as a metal member so that the operating characteristics are implemented by an attractive force between the magnet and the metal member in response that the driver operates the brake pedal.

The pedal link may include a rotary roller disposed on a portion provided to be in contact with the concave-convex portions, and the rotary roller and the concave-convex portions may be configured as magnets including different types of polarities so that the operating characteristics are implemented by an attractive force between the magnets including different polarities in response that the driver operates the brake pedal.

The pedal link may include a rotary roller disposed on a portion provided to be in contact with the concave-convex portions, and the rotary roller and the concave-convex portions may be configured as magnets including a same polarity so that the operating characteristics are implemented by a repulsive force between the magnets including the same polarity in response that the driver operates the brake pedal.

The pedal link may include a rotary roller disposed on a portion provided to be in contact with the concave-convex portions, and a contact area of the concave-convex portions with the rotary roller gradually may increase as a stroke of the brake pedal made by operation of the driver increases.

The concave-convex portions may extend leftward and rightward and be configured continuously in a movement direction of the pedal link.

The accelerator pedal module may include: an accelerator pedal stacked on the brake pedal and configured to move in a transverse direction relative to the brake pedal in response that the driver operates the accelerator pedal; and an accelerator pedal return spring including two opposite end portions connected to the brake pedal and the accelerator pedal and configured to return the accelerator pedal by moving the accelerator pedal in a direction, which is opposite to a direction in which the accelerator pedal is operated by the driver, in response that an operating force of the driver is removed from the accelerator pedal.

A second slot hole may be formed in a lateral surface of the brake pedal and extend leftward and rightward in a movement direction of the accelerator pedal, and a second stopper may be provided on a lateral surface of the accelerator pedal and inserted into the second slot hole so that a movement of the accelerator pedal is restricted by the second slot hole and the second stopper.

The accelerator pedal module may include: a second permanent magnet coupled to the accelerator pedal; and a second printed circuit board (PCB) provided on the brake pedal to face the second permanent magnet and configured to detect a change in magnetic flux and generate a signal related to a pedal function in response that a position of the second permanent magnet is changed by a movement of the accelerator pedal.

The accelerator pedal may include a pedal guide protruding and configured to come into contact with the driver's foot and transmit an operating force.

A pedal stopper may protrude from the brake pedal, and the accelerator pedal, which is returned by an elastic force of the accelerator pedal return spring, may come into contact with the pedal stopper so that a return position of the accelerator pedal is restricted.

A bottom surface of the accelerator pedal and a top surface of the pedal stopper may be equal to each other in protruding height, or the bottom surface of the accelerator pedal may further protrude than the top surface of the pedal stopper.

When the driver operates and moves the accelerator pedal and the brake pedal in a direction of the base housing in a state in which the accelerator pedal is operated by being moved in the transverse direction by the driver, an acceleration signal may be ignored, and a brake signal may be preferentially adopted to implement a braking function.

According to the electronic pedal apparatus according to an exemplary embodiment of the present disclosure, the brake pedal module and the accelerator pedal module are vertically coupled in a stacked manner and form the single one-pedal so that the pedal apparatus may be configured compactly as a whole, which provides effects of reducing weight and costs and maximizing utilization of the internal space of the vehicle.

Furthermore, the driver may operate the electronic pedal apparatus according to an exemplary embodiment of the present disclosure with a small effort. The operation direction of the brake pedal and the operation direction of the accelerator pedal are different from each other, which provides effects of preventing an erroneous operation and ensuring safety at the time of operating the pedal.

Furthermore, the electronic pedal apparatus according to an exemplary embodiment of the present disclosure implements the operating characteristics (operating feeling) by use of the rotary roller of the pedal link and the concave-convex portions of the operating characteristic implementing portion at the time of operating the brake pedal, which provides an effect of enabling the driver to easily recognize an operation situation of the brake pedal.

Furthermore, according to the electronic pedal apparatus according to an exemplary embodiment of the present disclosure, as the stroke of the brake pedal made by operation of the driver increases, the contact area between the rotary roller and the concave-convex portions gradually increases, and the operating characteristics (operating feeling) also gradually increases, which provides an advantage in enabling the driver to more easily recognize an operation amount of the brake pedal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 13 is operated.

FIG. 19 is operated.

Figure 1:
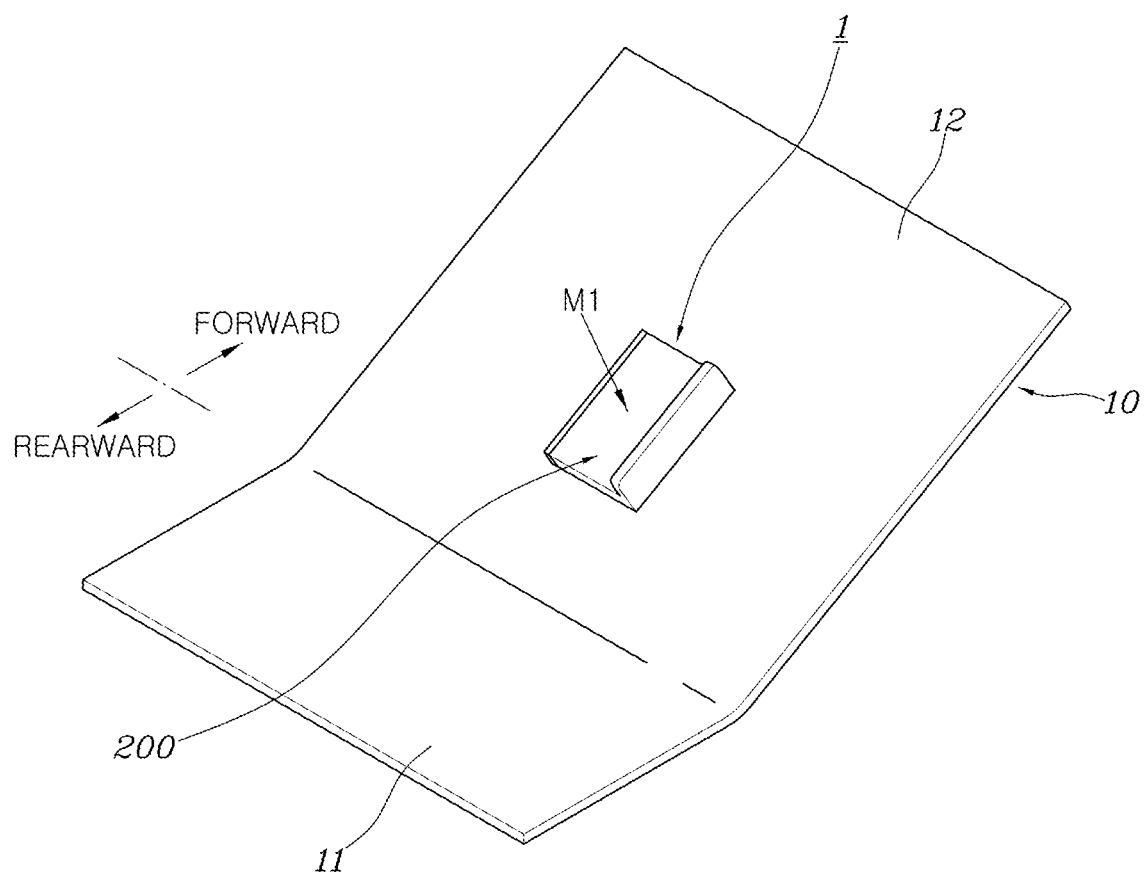
FIG. 1 is a view exemplarily illustrating a state in which an electronic pedal apparatus is provided on a vehicle body panel according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic pedal apparatus according to an exemplary embodiment of the present disclosure will be described with reference to the accompanying drawings.

As illustrated in FIGS. 1 to 23, an electronic pedal apparatus according to an exemplary embodiment of the present disclosure is characterized in that the electronic pedal apparatus includes a brake pedal module 100 and an accelerator pedal module 200 coupled in a stacked manner to form a single one-pedal 1, and the one-pedal 1 is provided on a vehicle body panel 10 disposed below a driver seat.

When the brake pedal module 100 and the accelerator pedal module 200 are vertically coupled in a stacked manner and form the single one-pedal 1, the electronic pedal apparatus may be configured compactly as a whole, which provides advantages in reducing weight and costs and maximizing utilization of an internal space of the vehicle.

The stacked structure of the brake pedal module 100 and the accelerator pedal module 200, which forms the single one-pedal, is made by installing the brake pedal module 100 on the vehicle body panel 10 first and then coupling the accelerator pedal module 200 to an upper side of the brake pedal module 100 in a stacked manner.

According to an exemplary embodiment of the present disclosure, the one-pedal 1, in which the accelerator pedal module 200 is stacked on the brake pedal module 100, is provided on an inclined surface 12 at a front side of the vehicle body panel 10. Therefore, the free-fall of foreign substances existing on the one-pedal 1 may be induced, which may automatically remove foreign substances from the one-pedal 1.

The vehicle body panel 10 provided with the one-pedal 1 may be a dash panel or a footrest panel positioned below the driver seat. The vehicle body panel 10 includes a bottom surface 11 and the inclined surface 12 extending forwards and upwards from the bottom surface 11, and the one-pedal 1 is provided on the inclined surface 12.

The present disclosure is characterized in that an operation direction in which the brake pedal module 100 is operated by the driver is different from an operation direction in which the accelerator pedal module 200 is operated by the driver. Therefore, it is possible to prevent an erroneous operation and ensure safety when a pedal is operated.

Figure 2:
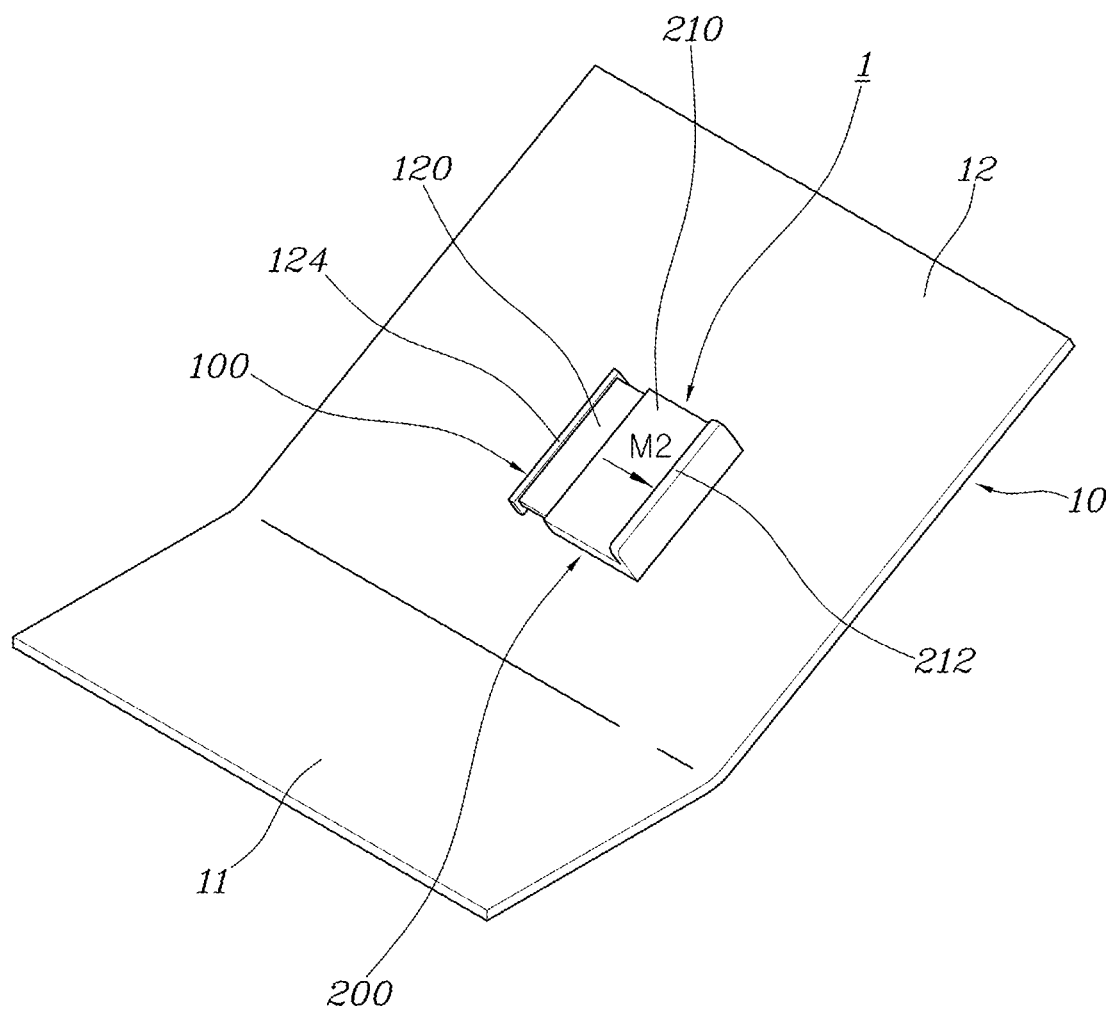
FIG. 2 is a view exemplarily illustrating a state in which an accelerator pedal in FIG. 1 is operated and moved rightward.
Figure 3:
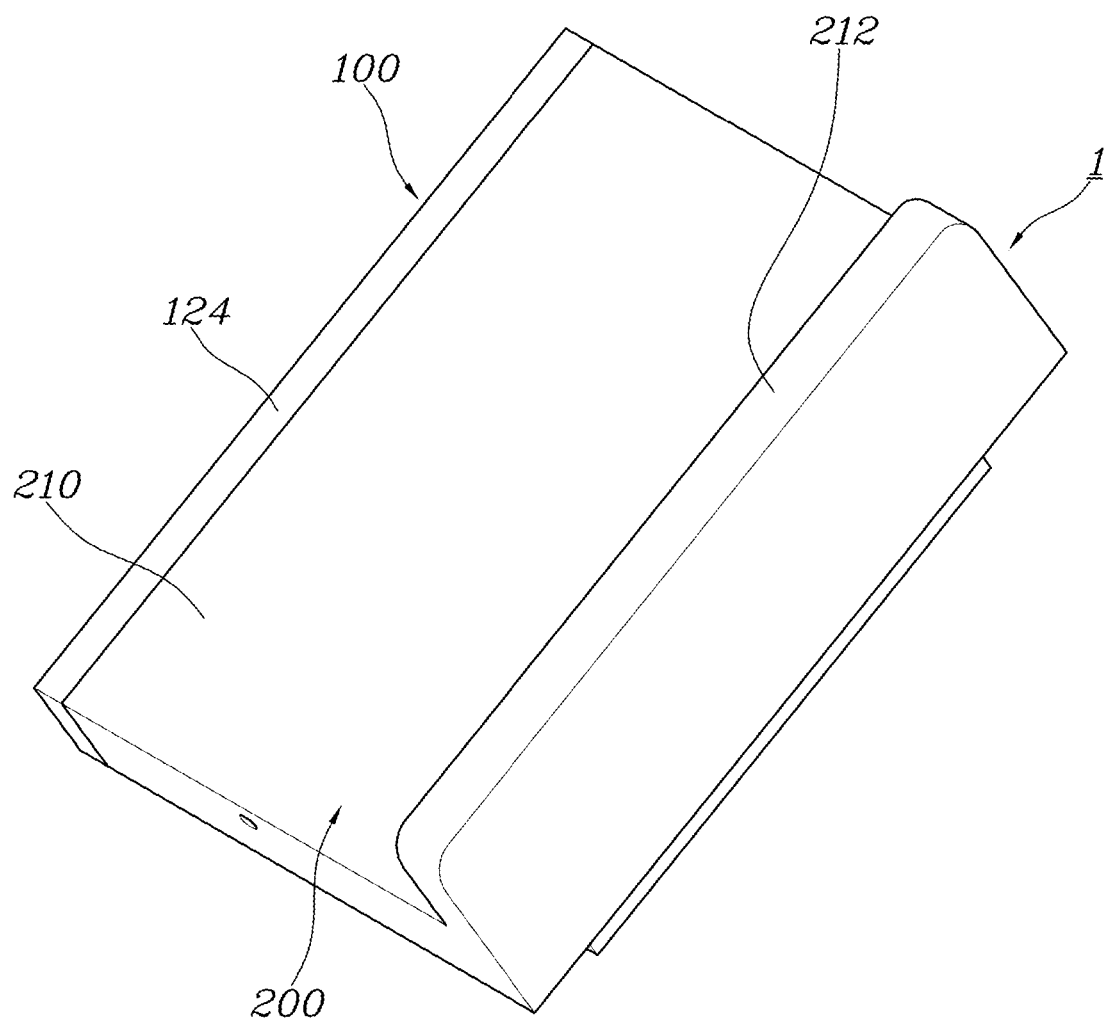
FIG. 3 is a perspective view of the electronic pedal apparatus according to an exemplary embodiment of the present disclosure.

That is, the brake pedal module 100 may be operated by the driver in a forward/rearward direction together with the accelerator pedal module 200 (see arrow M1 in FIG. 1), and the accelerator pedal module 200 may be operated in a transverse direction relative to the brake pedal module 100 (see arrow M2 in FIG. 2).

The brake pedal module 100 according to an exemplary embodiment of the present disclosure includes: a base housing 110 fixed to the vehicle body panel 10; a brake pedal 120 stacked on the base housing 110 and configured to be operated forward toward the base housing 110 by operation of the driver; and brake pedal return springs 130 each including two opposite end portions connected to the base housing 110 and the brake pedal 120, the brake pedal return spring 130 being configured to return the brake pedal 120 by moving the brake pedal 120 in a direction, which is opposite to a direction in which the brake pedal 120 is operated by the driver, when an operating force of the driver is removed from the brake pedal 120.

The base housing 110 may be provided in a form of a hexahedral casing opened at an upper side thereof and fixed to the inclined surface 12 of the vehicle body panel 10.

The brake pedal 120 is provided to cover the opened upper side of the base housing 110. The brake pedal return spring 130 is provided to be positioned between the base housing 110 and the brake pedal 120.

The brake pedal return spring 130 is provided in a form of a compression spring. Two or more brake pedal return springs 130 may be provided to ensure stability at the time of operating the pedal.

According to an exemplary embodiment of the present disclosure, first slot holes 111 are formed in lateral surfaces of the base housing 110 and extend in a movement direction of the brake pedal 120, and first stoppers 121 are formed on lateral surfaces of the brake pedal 120 and inserted into the first slot holes 111 so that a movement of the brake pedal 120 in the forward/rearward direction is restricted by the first slot holes 111 and the first stoppers 121.

The first slot holes 111 are respectively formed in the two lateral surfaces of the base housing 110 that face each other. The two first stoppers 121, which are each provided in a form of a protrusion including a predetermined length, are formed on the brake pedal 120 and respectively inserted into the first slot holes 111. Therefore, the movement of the brake pedal 120 in the forward/rearward direction may be restricted by the first slot holes 111 and the first stoppers 121 when the driver operates the brake pedal 120.

The brake pedal module 100 according to an exemplary embodiment of the present disclosure includes: first permanent magnets 140 coupled to the brake pedal 120; and a first PCB 150 provided in the base housing 110 to face the first permanent magnets 140 and configured to detect a change in magnetic flux and generate a signal related to a pedal function when positions of the first permanent magnets 140 are changed by the movement of the brake pedal 120.

In an exemplary embodiment of the present disclosure, the first PCB 150 includes a Hall sensor. The signal related to the pedal function, which is generated by the first PCB 150, may be a braking signal for the vehicle.

Furthermore, the brake pedal module 100 according to an exemplary embodiment of the present disclosure may further include a pedal link 160 rotatably coupled to the brake pedal 120; and an operating characteristic implementing portion 170 fixed to the base housing 110 and provided to be in contact with the pedal link 160, the operating characteristic implementing portion 170 including concave-convex portions 171, which are contact portions with the pedal link 160, and configured to implement operating characteristics (operating feeling) by contact between the pedal link 160 and the concave-convex portions 171 when the driver operates the brake pedal 120.

The pedal link 160 has four rod portions connected to form a quadrangular frame structure. The rod portion at an upper end portion thereof is inserted into a link groove 122 formed in a bottom surface of the brake pedal 120 so that the pedal link 160 is rotatably coupled to the brake pedal 120.

The pedal link 160 includes a rotary roller 161 disposed on a portion (the rod portion at a lower end) provided to be in contact with the concave-convex portions 171. Therefore, when the driver operates the brake pedal 120, the pedal link 160 may smoothly rotate relative to the brake pedal 120, and the rotary roller 161 may move along the concave-convex portions 171 (see arrow M3 in FIG. 10).

In the exemplary embodiment of the present disclosure, any one of the rotary roller 161 and the concave-convex portions 171 is configured as a magnet, and the other of the rotary roller 161 and the concave-convex portions 171 is configured as a metal (steel) member so that the operating characteristics may be implemented by an attractive force between the magnet and the metal member when the driver operates the brake pedal 120.

The structure using the magnet and the metal member is advantageous in implementing the operating characteristics at a low cost.

As an exemplary embodiment of the present disclosure, the rotary roller 161 and the concave-convex portions 171 are configured as magnets including different types of polarities so that the operating characteristics may be implemented by an attractive force between the magnets including different polarities when the driver operates the brake pedal 120.

The concave-convex portions 171 may include the S-pole when the rotary roller 161 includes the N-pole. Alternatively, the concave-convex portions 171 may include the N-pole when the rotary roller 161 includes the S-pole.

As yet another example, the rotary roller 161 and the concave-convex portions 171 are configured as magnets including the same polarity so that the operating characteristics may be implemented by a repulsive force between the magnets including a same polarity when the driver operates the brake pedal 120.

The rotary roller 161 and the concave-convex portions 171 may include the S-pole or the N-pole.

In the exemplary embodiment of the present disclosure, a contact area of the concave-convex portions 171 with the rotary roller 161 may gradually increase as a stroke of the brake pedal 120 made by operation of the driver increases. Therefore, the driver may more assuredly recognize an operation amount of the brake pedal 120 by a degree of concaveness and convexness that gradually increases as the stroke increases at the time of operating the brake pedal 120.

For example, as illustrated in the drawings, the concave-convex portions 171 may include a triangular shape. As an exemplary embodiment of the present disclosure, the concave-convex portions 171 may include a trapezoidal shape or an arc shape including an elliptical trajectory.

The concave-convex portions 171 according to an exemplary embodiment of the present disclosure may extend leftward and rightward and be configured continuously in the movement direction (arrow M3) of the pedal link 160.

Therefore, when the pedal link 160 passes the concave-convex portions 171 while being in contact with the concave-convex portions 171 as the driver operates the brake pedal 120, the pedal link 160 passes the concave-convex portions 171 while moving in an upward/downward direction along a shape of the concave-convex portions 171 so that the operating characteristics may be implemented by the concave-convex portions 171.

The accelerator pedal module 200 according to an exemplary embodiment of the present disclosure includes: an accelerator pedal 210 stacked on the brake pedal 120 and configured to move in a transverse direction relative to the brake pedal 120 when the driver operates the accelerator pedal 210; and accelerator pedal return springs 220 each including two opposite end portions connected to the brake pedal 120 and the accelerator pedal 210, the accelerator pedal return spring 220 being configured to return the accelerator pedal 210 by moving the accelerator pedal 210 in a direction, which is opposite to a direction in which the accelerator pedal 210 is operated by the driver, when an operating force of the driver is removed from the accelerator pedal 210.

The accelerator pedal 210 is stacked on the brake pedal 120 and operates to move rightward relative to the brake pedal 120 when the driver operates the accelerator pedal 210.

The accelerator pedal return spring 220 is disposed to extend in the movement direction of the accelerator pedal 210, and the two opposite end portions of the accelerator pedal return spring 220 are connected to the brake pedal 120 and the accelerator pedal 210. The accelerator pedal return spring 220 is provided in the form of a compression spring. Two or more accelerator pedal return springs 220 may be provided to ensure stability at the time of operating the pedal.

According to an exemplary embodiment of the present disclosure, second slot holes 123 are formed in lateral surfaces of the brake pedal 120 and extend leftward and rightward in a movement direction of the accelerator pedal 210, and second stoppers 211 are provided on lateral surfaces of the accelerator pedal 210 and inserted into the second slot holes 123 so that a movement of the accelerator pedal 210 in a leftward/rightward direction is restricted by the second slot holes 123 and the second stoppers 211.

The second slot holes 123 are respectively formed in the two lateral surfaces of the brake pedal 120 that face each other. The two second stoppers 211, which are each provided in the form of a protrusion including a predetermined length, are formed on the accelerator pedal 210 and respectively inserted into the second slot hole 123. Therefore, the movement of the accelerator pedal 210 in the leftward/rightward direction may be restricted by the second slot holes 123 and the second stoppers 211 when the driver operates the accelerator pedal 210.

The accelerator pedal module 200 according to an exemplary embodiment of the present disclosure includes: second permanent magnets 230 coupled to the accelerator pedal 210; and second PCBs 240 provided on the brake pedal 120 to face the second permanent magnets 230 and configured to detect a change in magnetic flux and generate a signal related to a pedal function when positions of the second permanent magnets 230 are changed by the movement of the accelerator pedal 210.

In an exemplary embodiment of the present disclosure, the second PCB 240 includes a Hall sensor. The signal related to the pedal function, which is generated by the second PCB 240, may be an acceleration signal for the vehicle.

Figure 11:
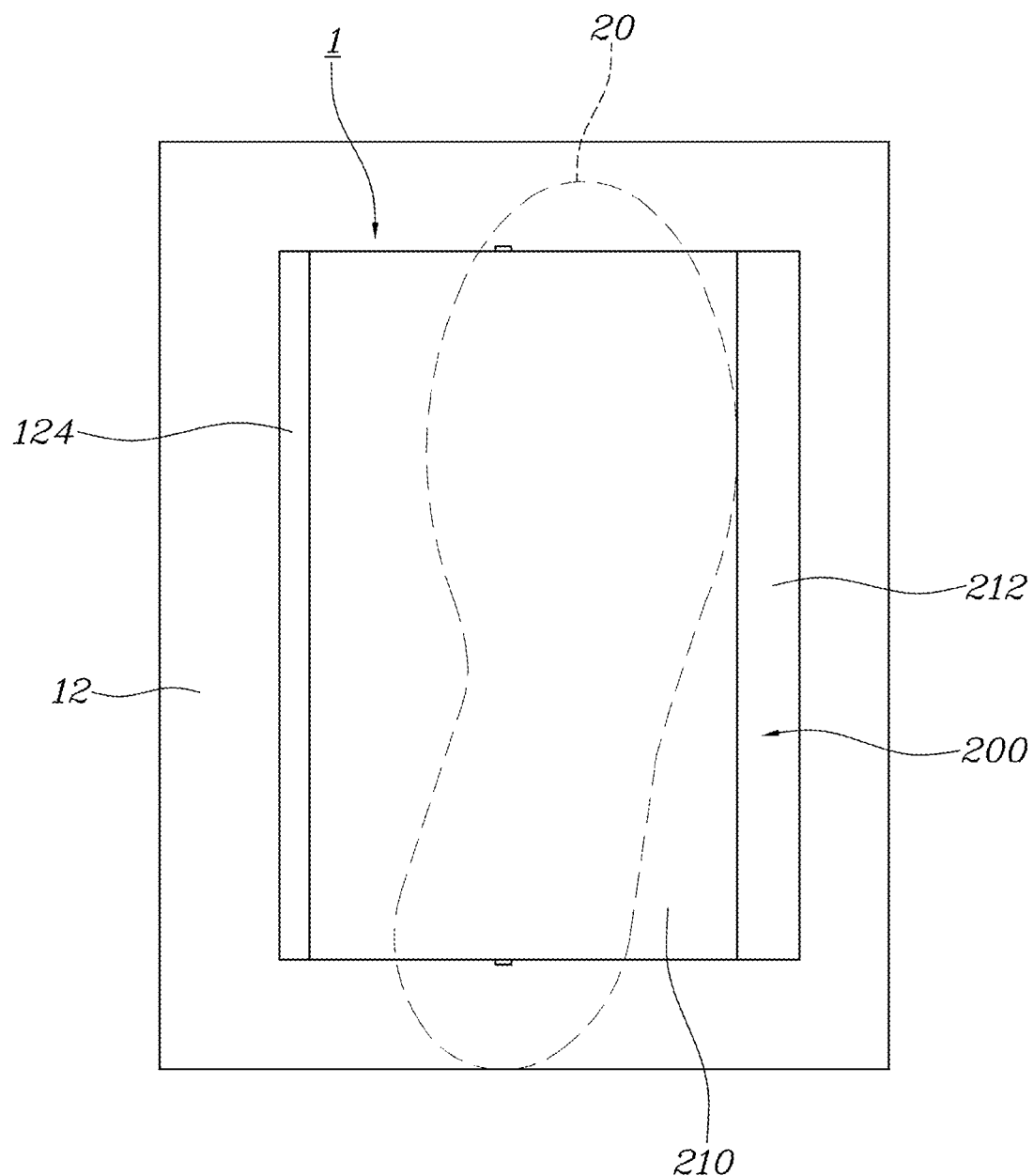
FIG. 11 is a view exemplarily illustrating a state in which a driver's foot placed on the accelerator pedal is in contact with a pedal guide according to an exemplary embodiment of the present disclosure.
Figure 12:
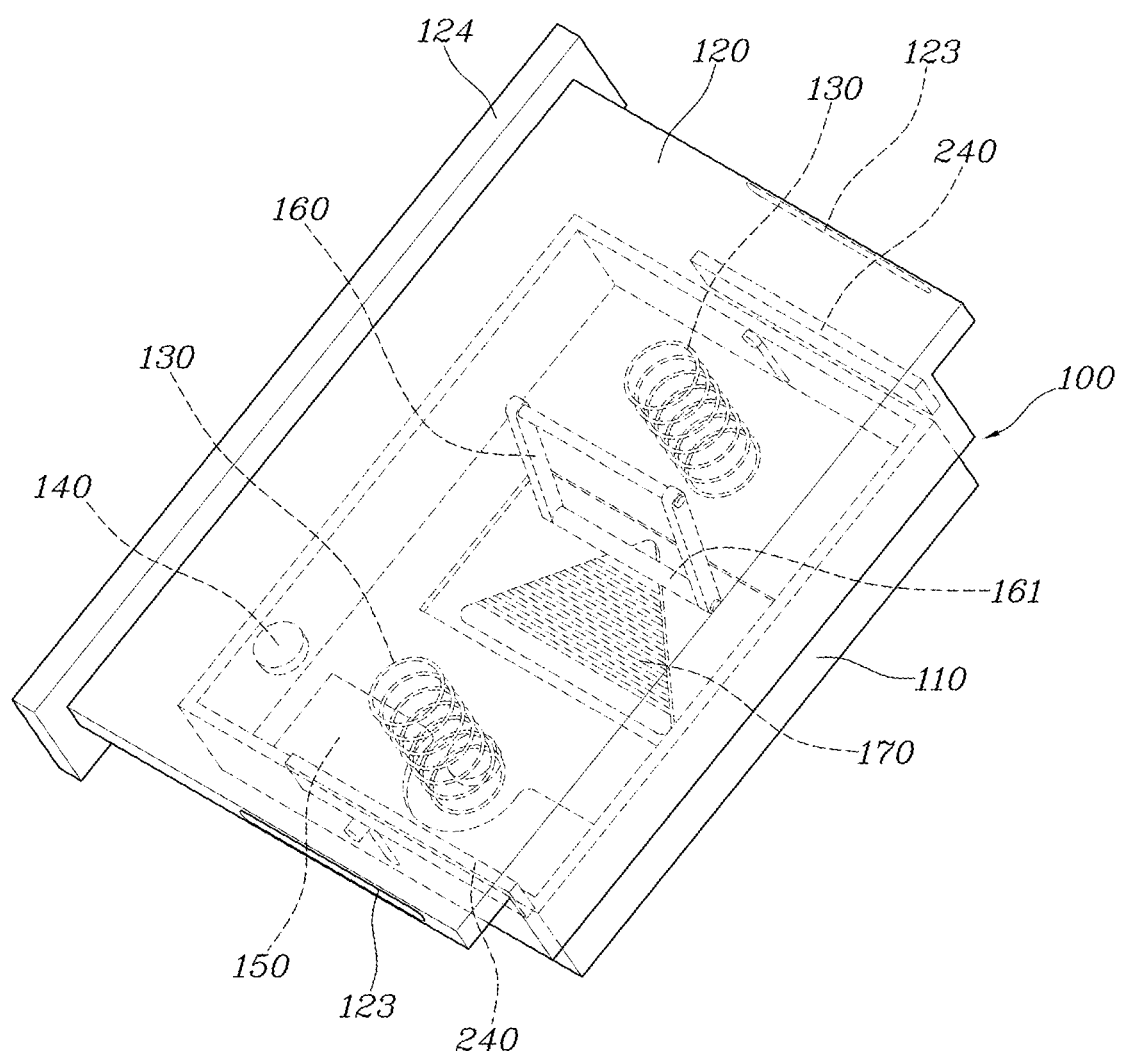
FIG. 12, and FIG. 13 are views exemplarily illustrating states in which the accelerator pedal is removed from the electronic pedal apparatus according to an exemplary embodiment of the present disclosure and illustrating states made before the brake pedal is operated.
Figure 13:
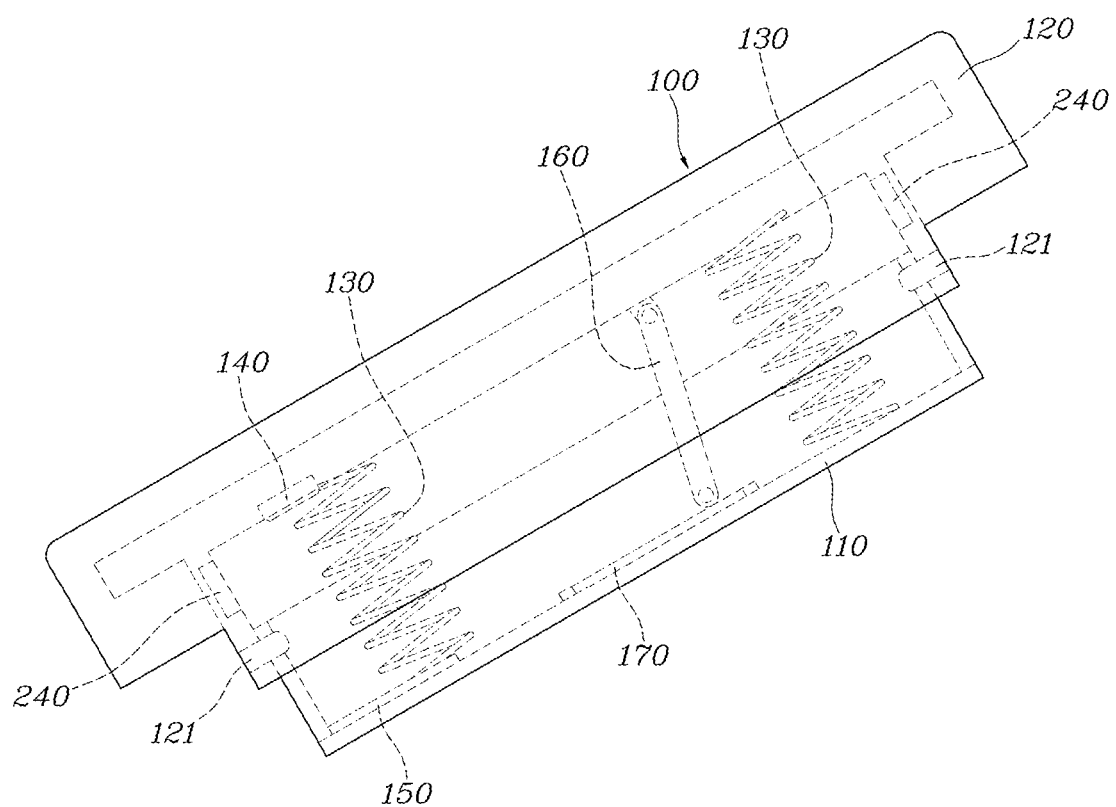
Figure 14:
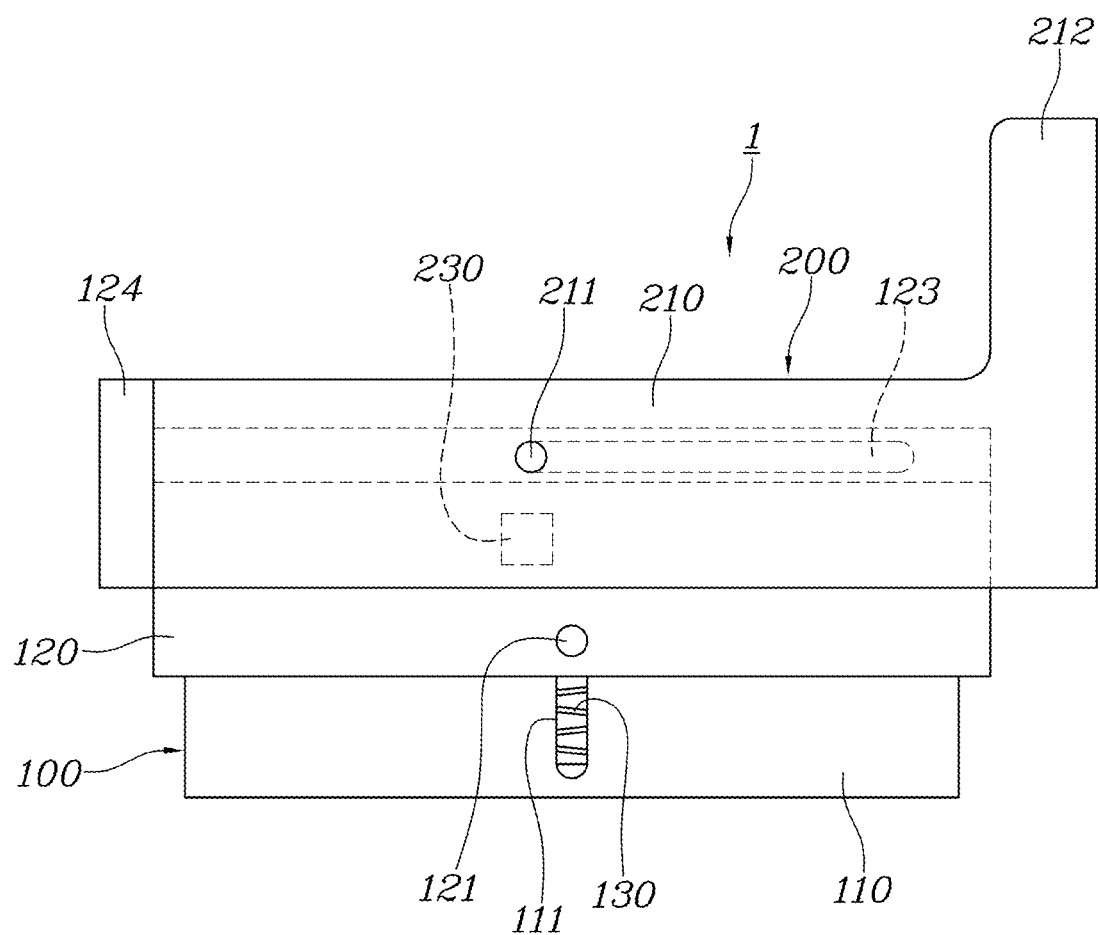
FIG. 14 is a side view exemplarily illustrating a state in which the accelerator pedal in FIG. 12 is stacked.
Figure 15:
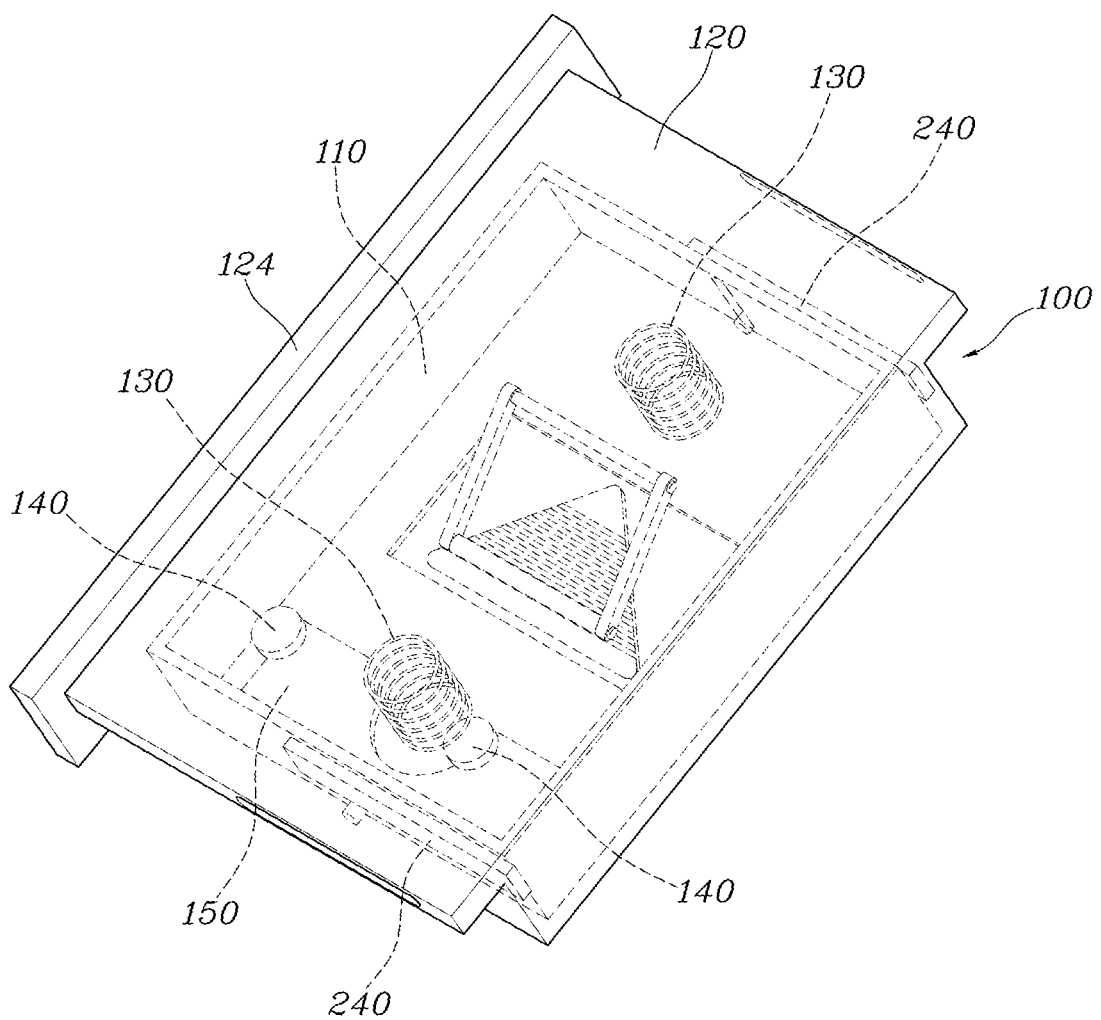
FIG. 15 and FIG. 16 are views exemplarily illustrating states made after the brake pedal in FIG. 12.
Figure 16:
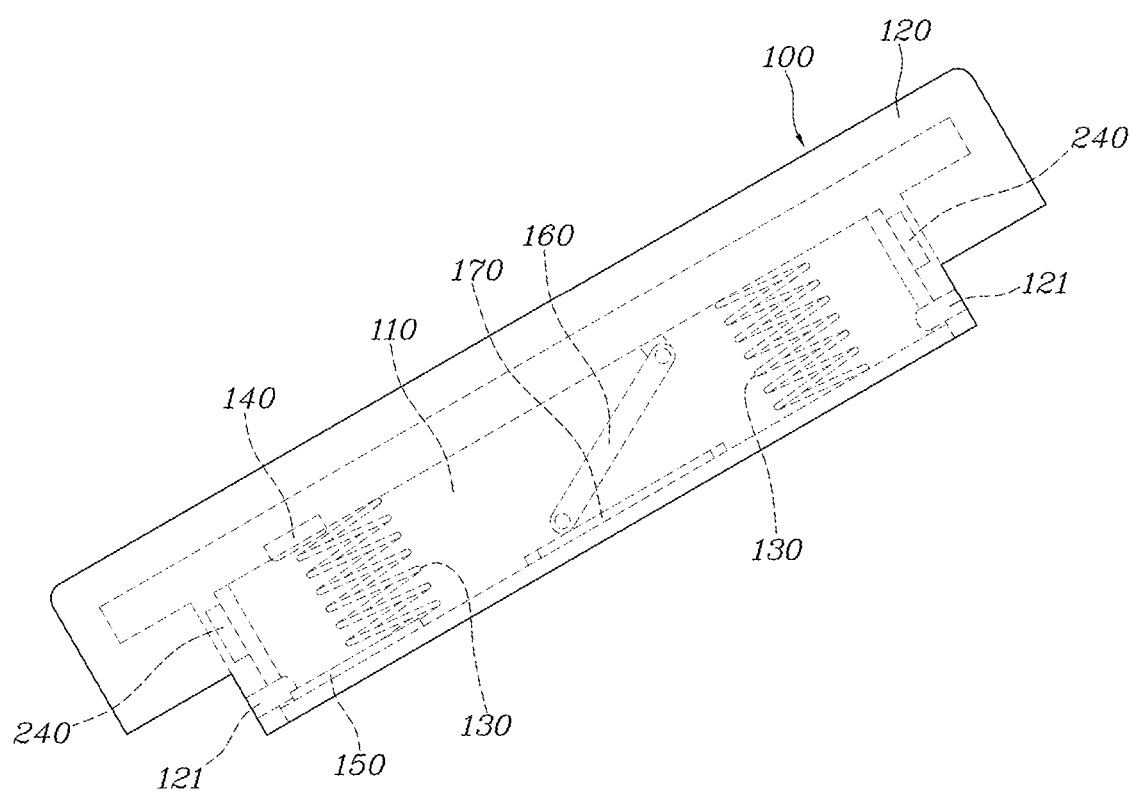
Figure 17:
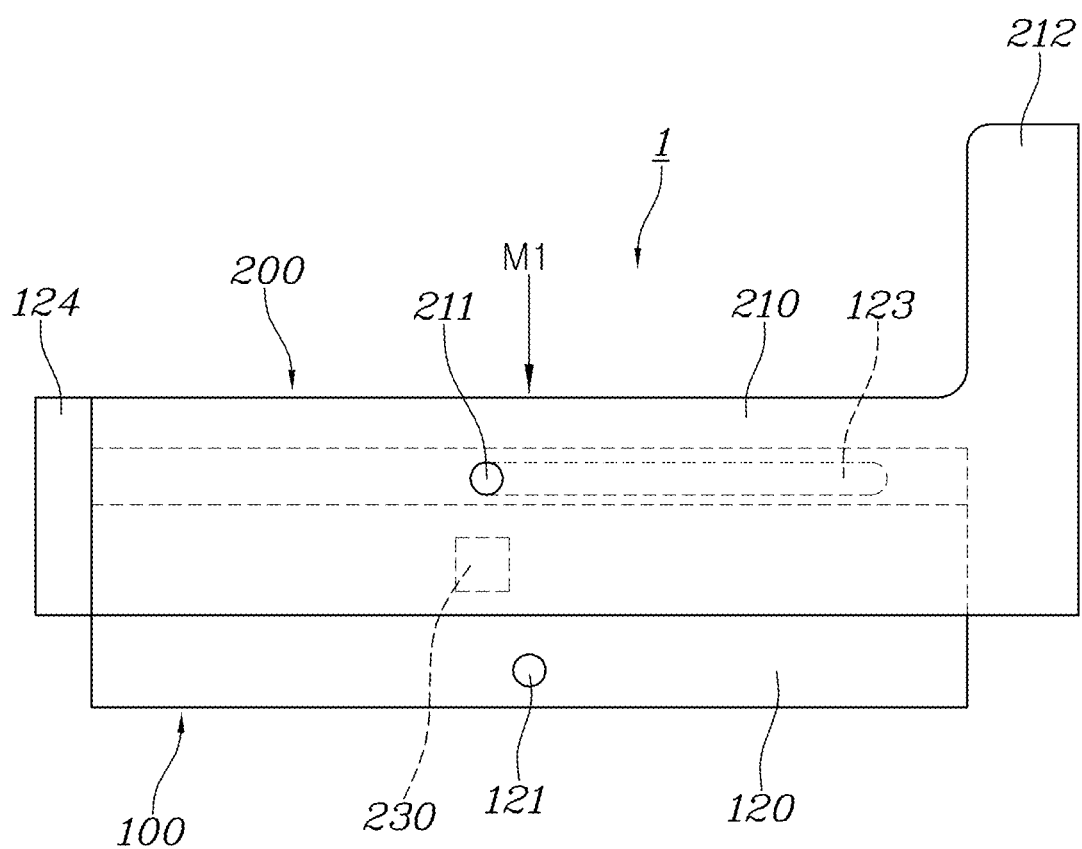
FIG. 17 is a side view exemplarily illustrating a state in which the accelerator pedal in FIG. 15 is stacked.
Figure 18:
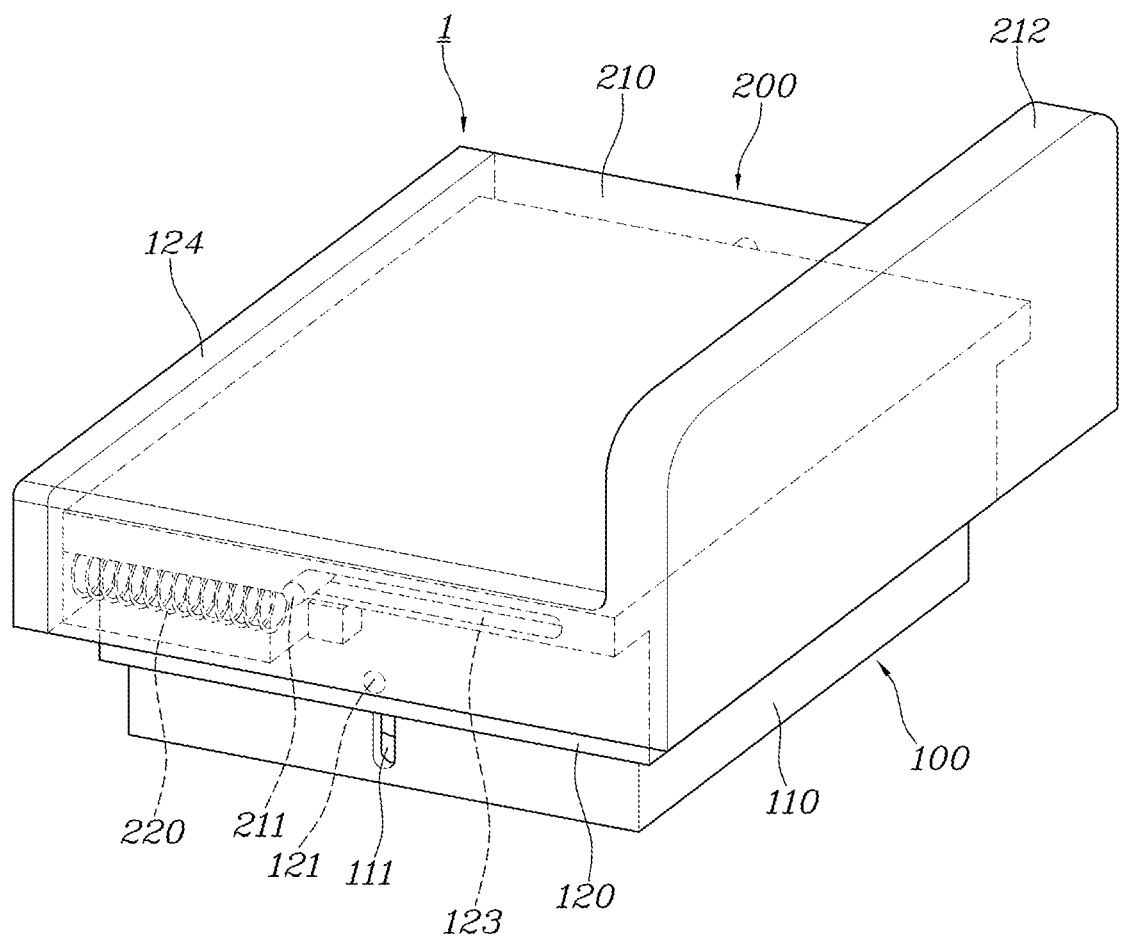
FIG. 18 and FIG. 19 are views exemplarily illustrating states made before the accelerator pedal of the electronic pedal apparatus according to an exemplary embodiment of the present disclosure is operated.
Figure 19:
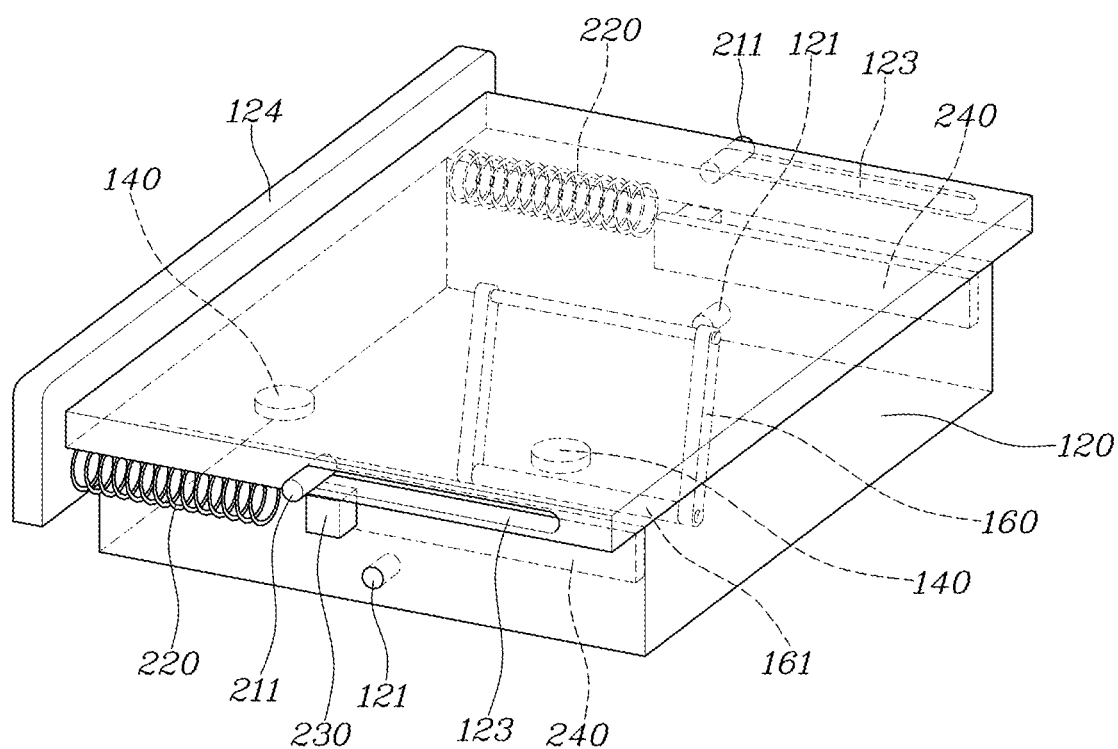
Figure 20:
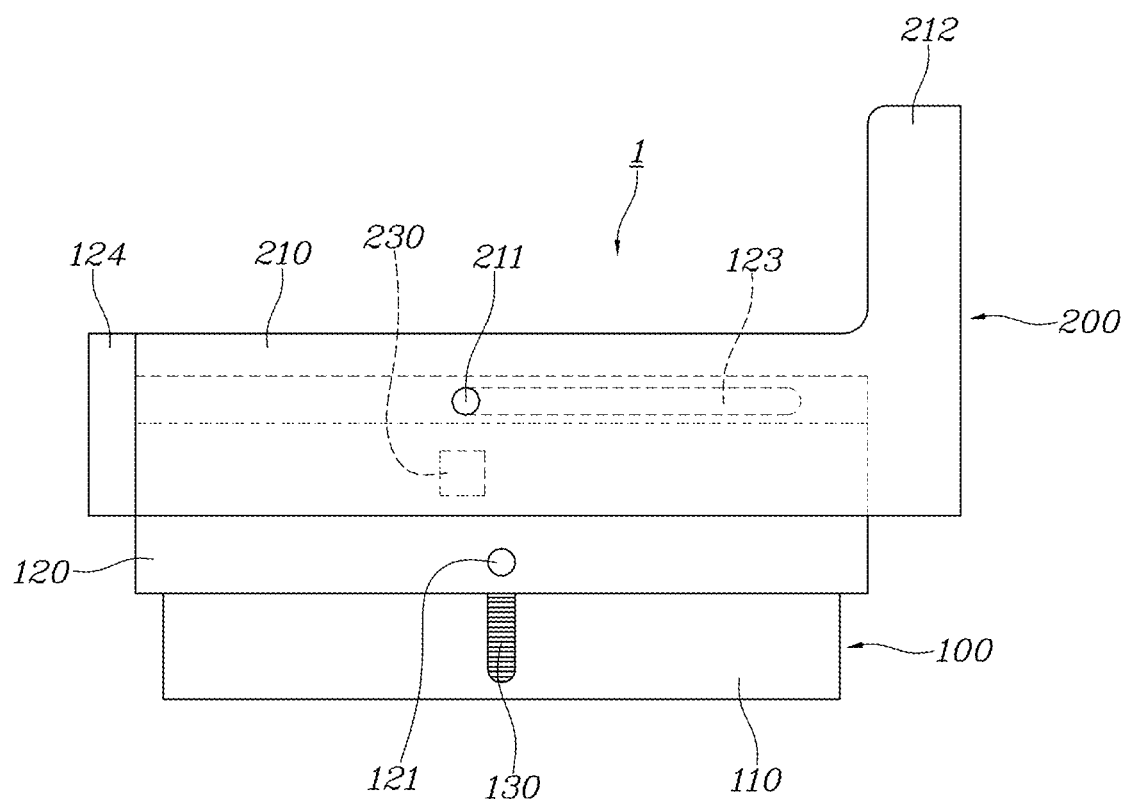
FIG. 20 is a side view of FIG. 18.
Figure 21:
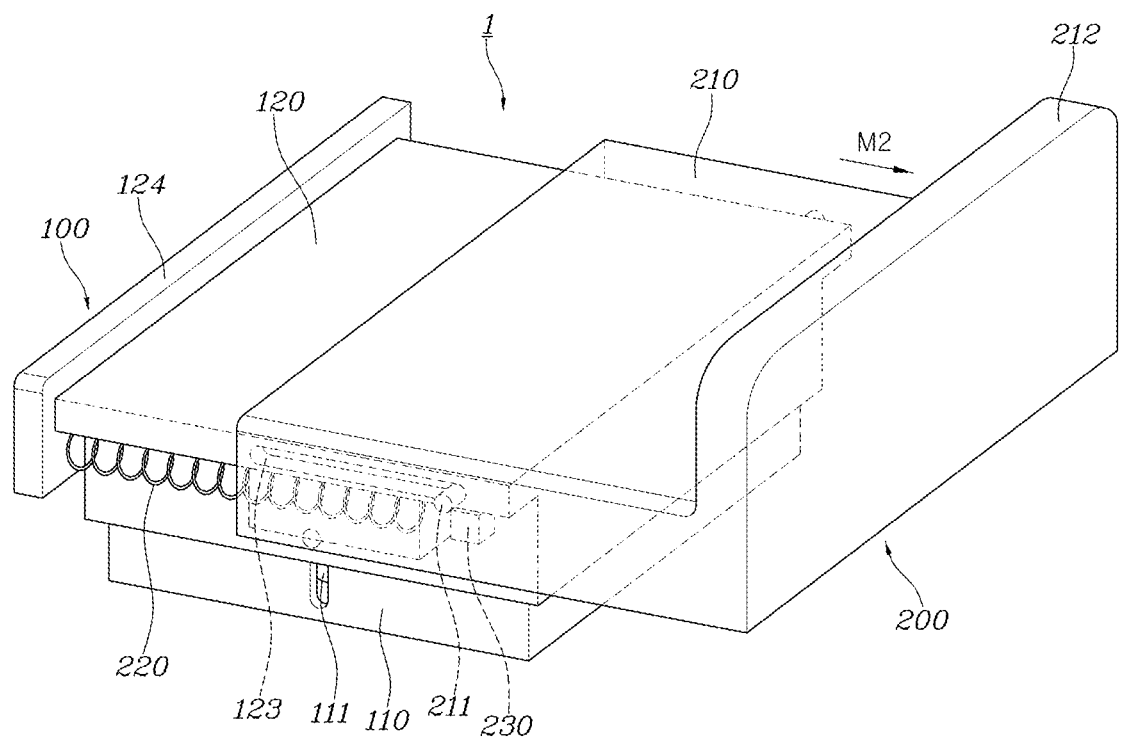
FIG. 21 and FIG. 22 are views exemplarily illustrating states made after the accelerator pedal in FIG. 18
Figure 22:
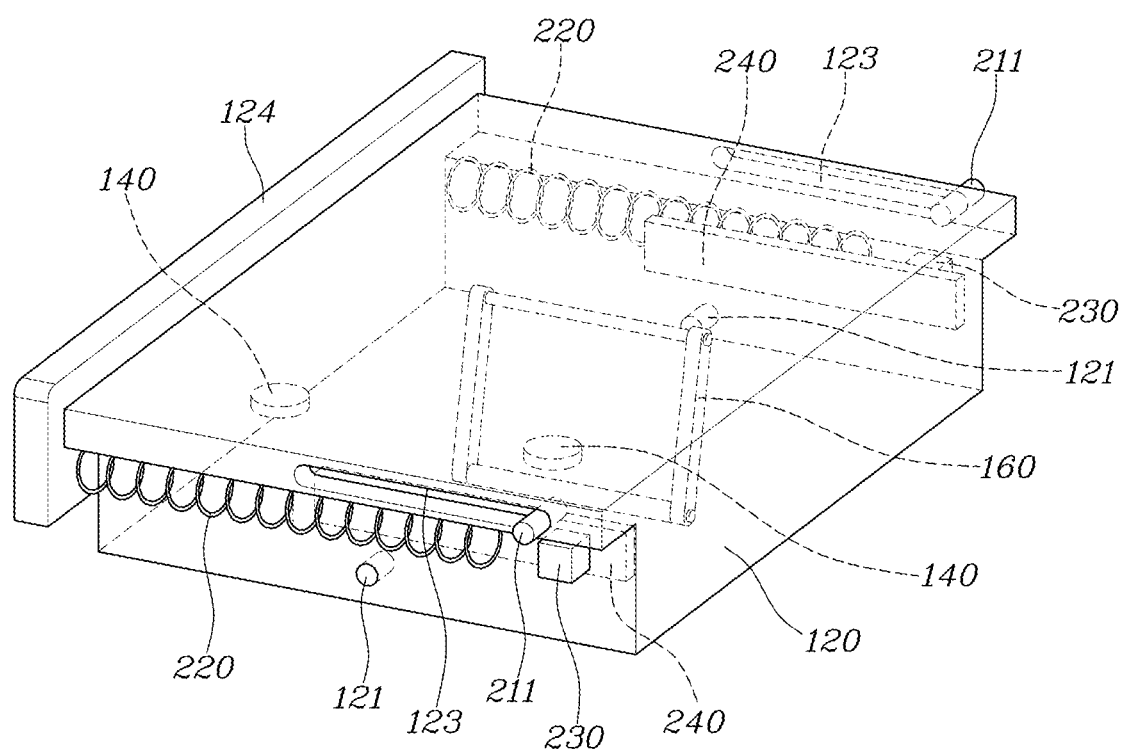
Figure 23:
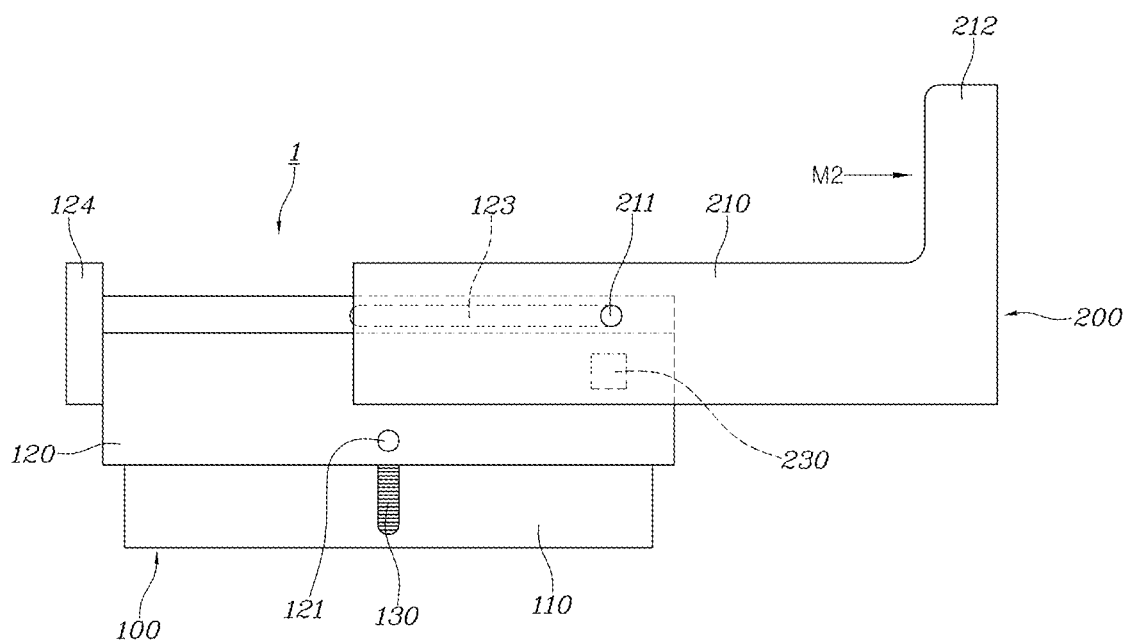
FIG. 23 is a side view of FIG. 21.

As illustrated in FIG. 11, the accelerator pedal 210 according to an exemplary embodiment of the present disclosure includes a pedal guide 212 protruding upward and configured to come into contact with the driver's foot 20 and transmit an operating force.

The driver places his or her foot 20 on the accelerator pedal 210 and operates the accelerator pedal 210 by moving the accelerator pedal 210 rightward.

As described above, the pedal guide 212 protrudes upwards from a right end portion of the accelerator pedal 210 so that the driver may more easily move the accelerator pedal 210 rightward when the driver operates the accelerator pedal 210. A right side of the driver's foot 20 placed on the accelerator pedal 210 may come into contact with the pedal guide 212 to transmit the operating force of the driver to the pedal guide 212.

According to an exemplary embodiment of the present disclosure, a pedal stopper 124 protrudes upwards from a left end portion of the brake pedal 120 disposed opposite to the pedal guide 212.

When the driver removes an operating force after operating the accelerator pedal 210 by moving the accelerator pedal 210 rightward, the accelerator pedal 210 is returned by being moved leftward by an elastic force of the accelerator pedal return spring 220, and a left end portion of the accelerator pedal 210, which is being returned, comes into contact with the pedal stopper 124 of the brake pedal 120 so that a return position of the accelerator pedal 210 is restricted.

Figure 4:
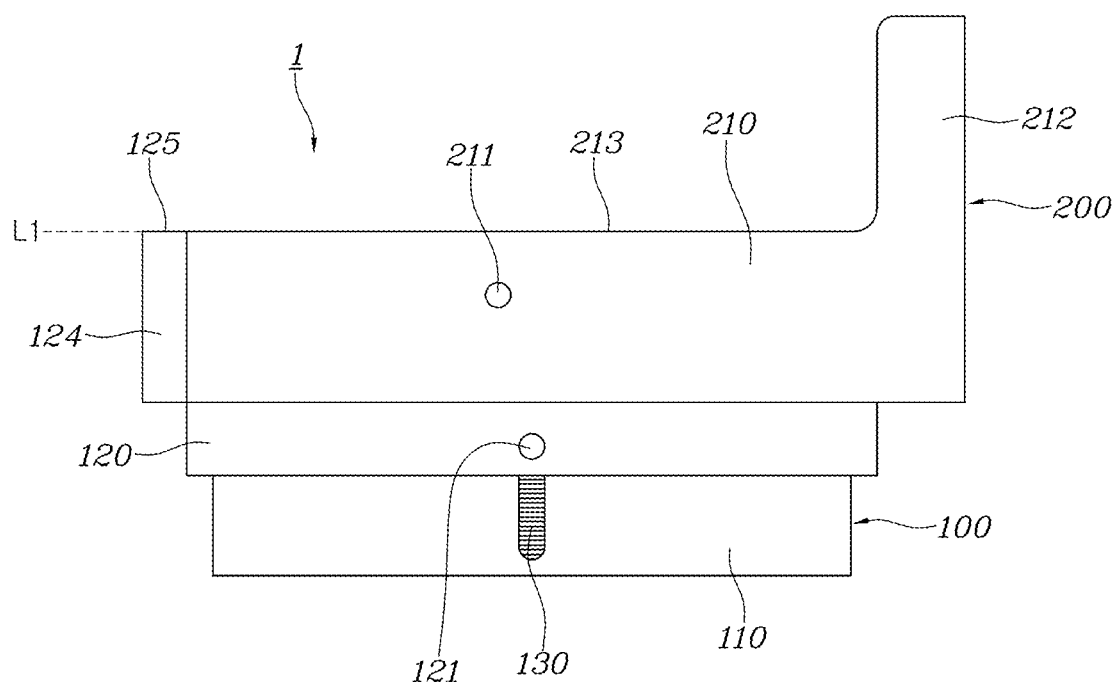
FIG. 4 and FIG. 5 are a side view and an exploded view of FIG. 3.
Figure 5:
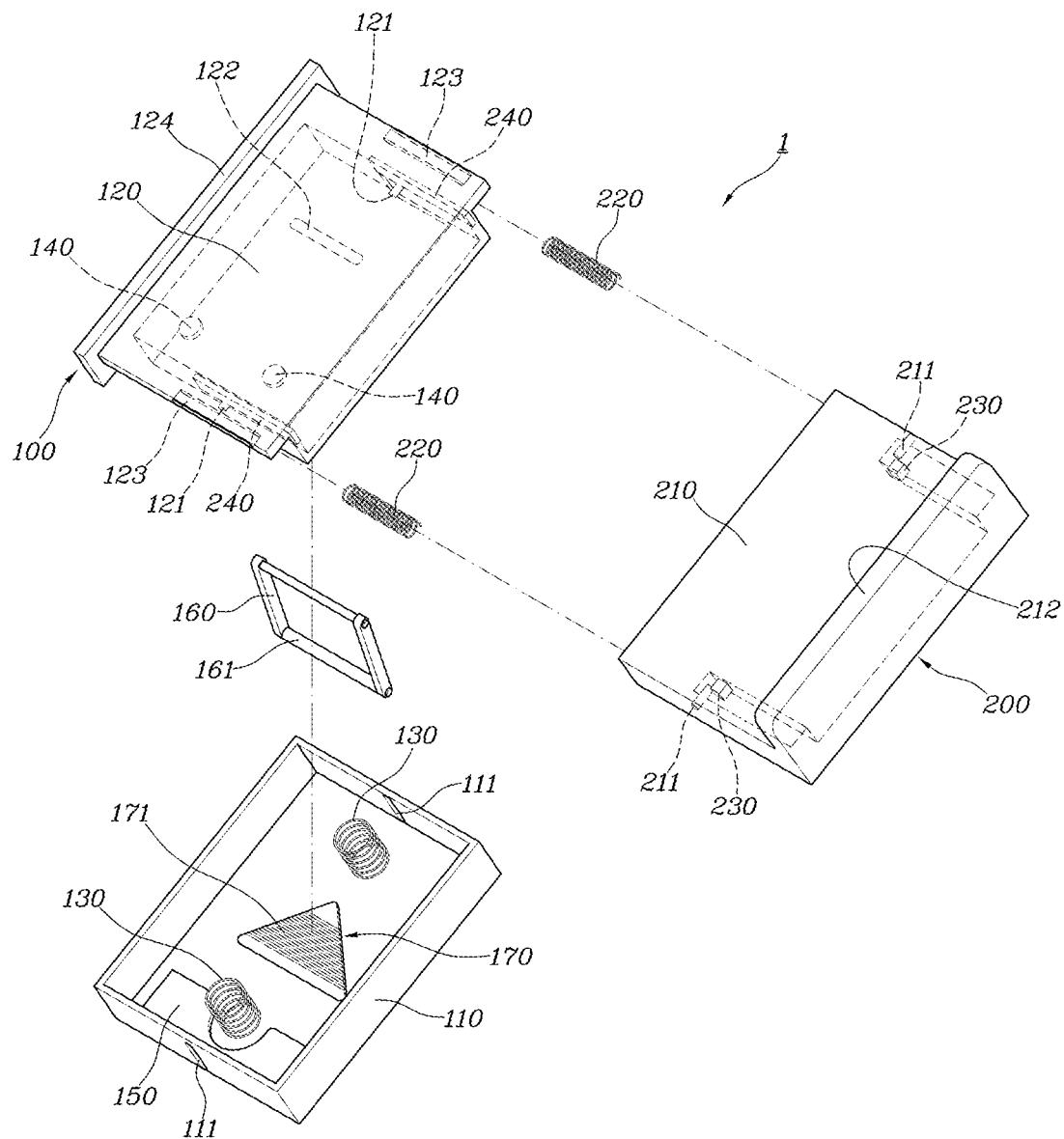
Figure 6:
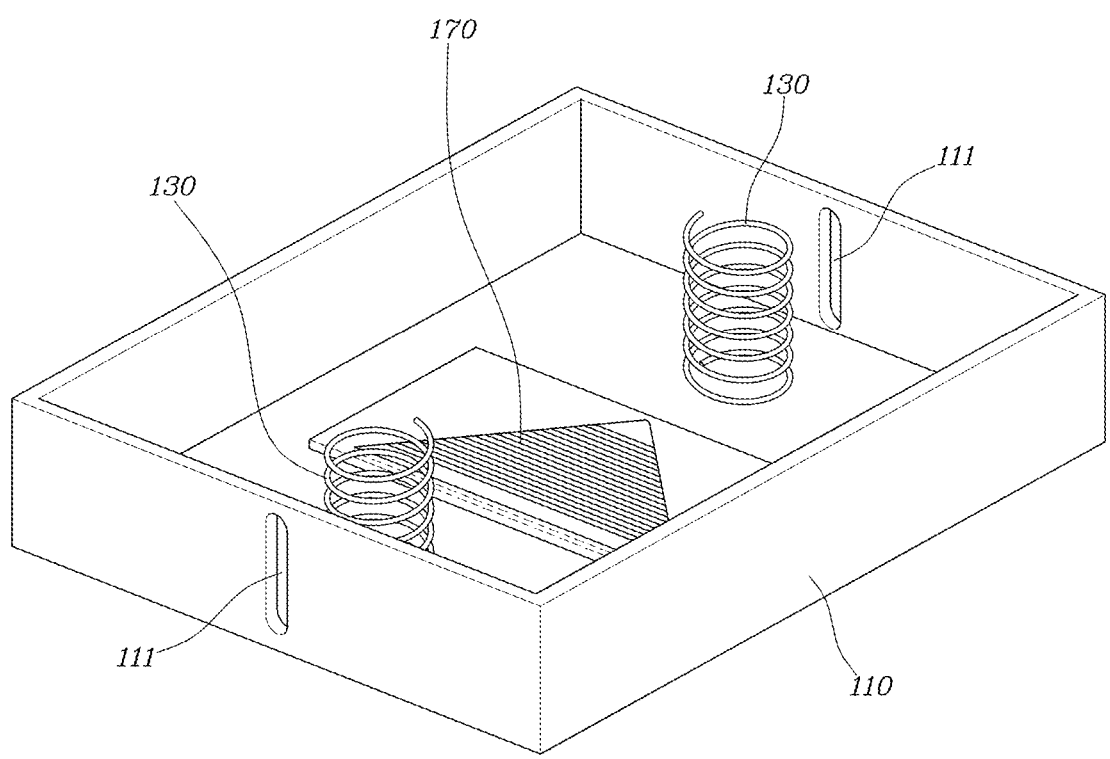
FIG. 6 is a view of a base housing according to an exemplary embodiment of the present disclosure.
Figure 7:
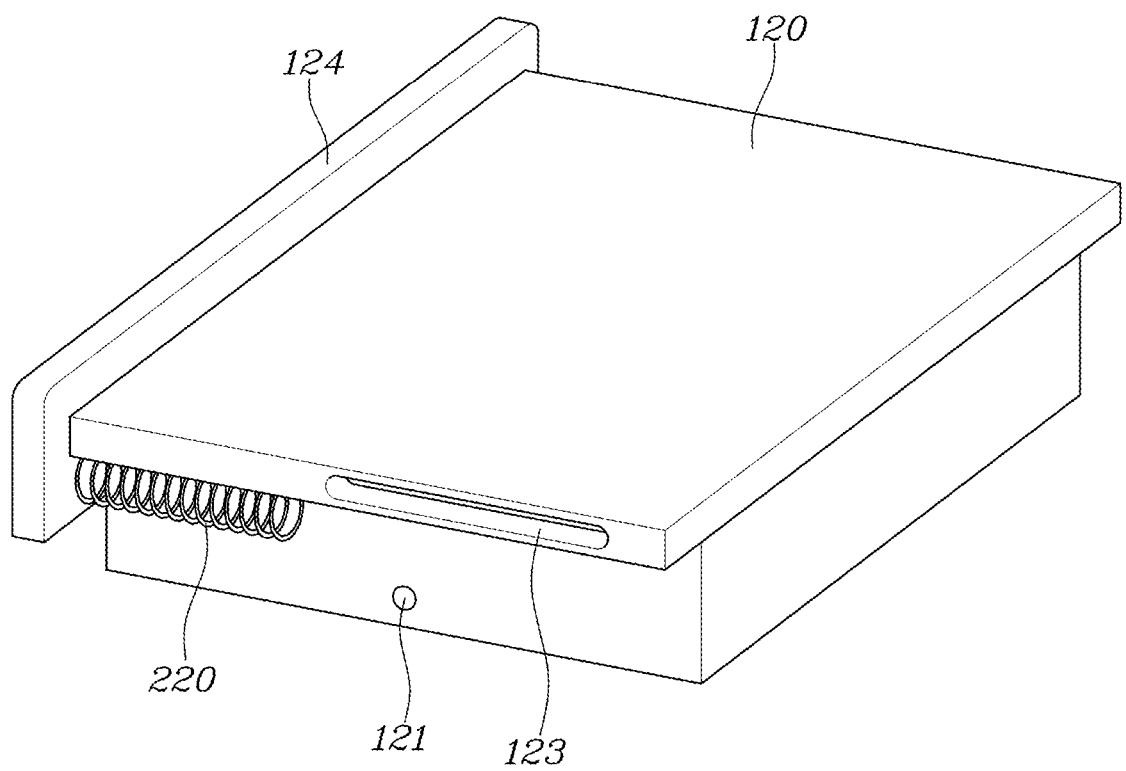
FIG. 7 and FIG. 8 are views of a brake pedal according to an exemplary embodiment of the present disclosure.
Figure 8:
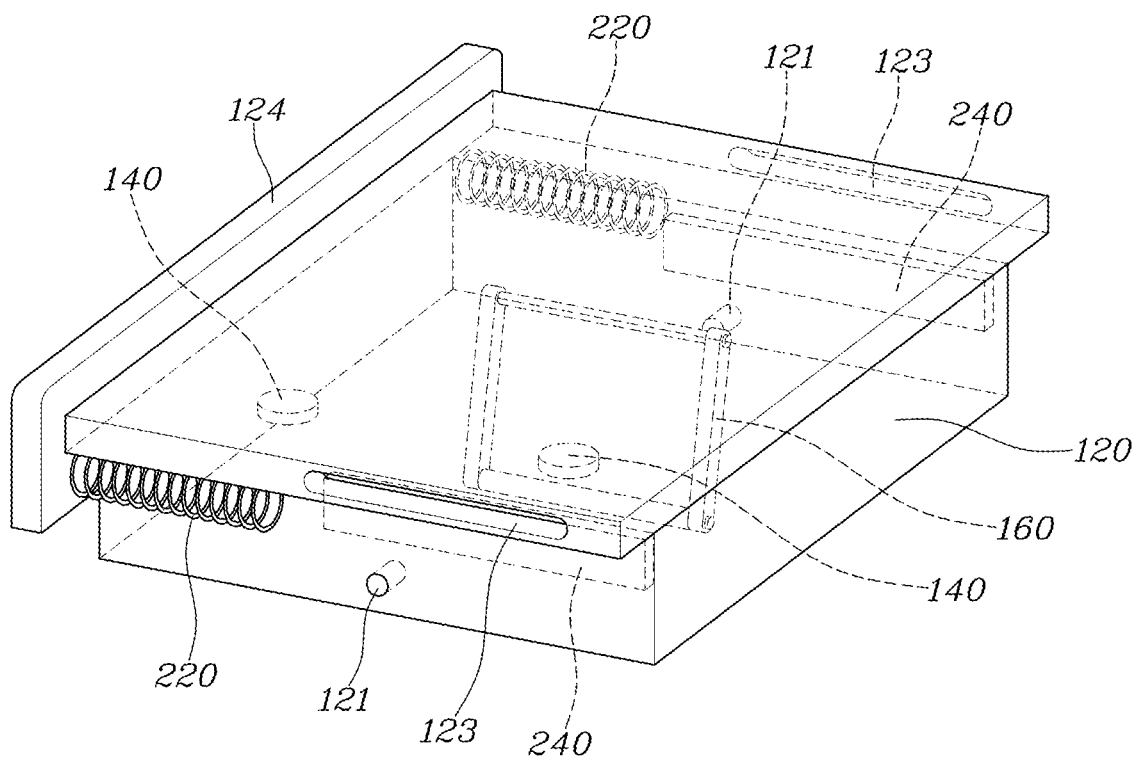
Figure 9:
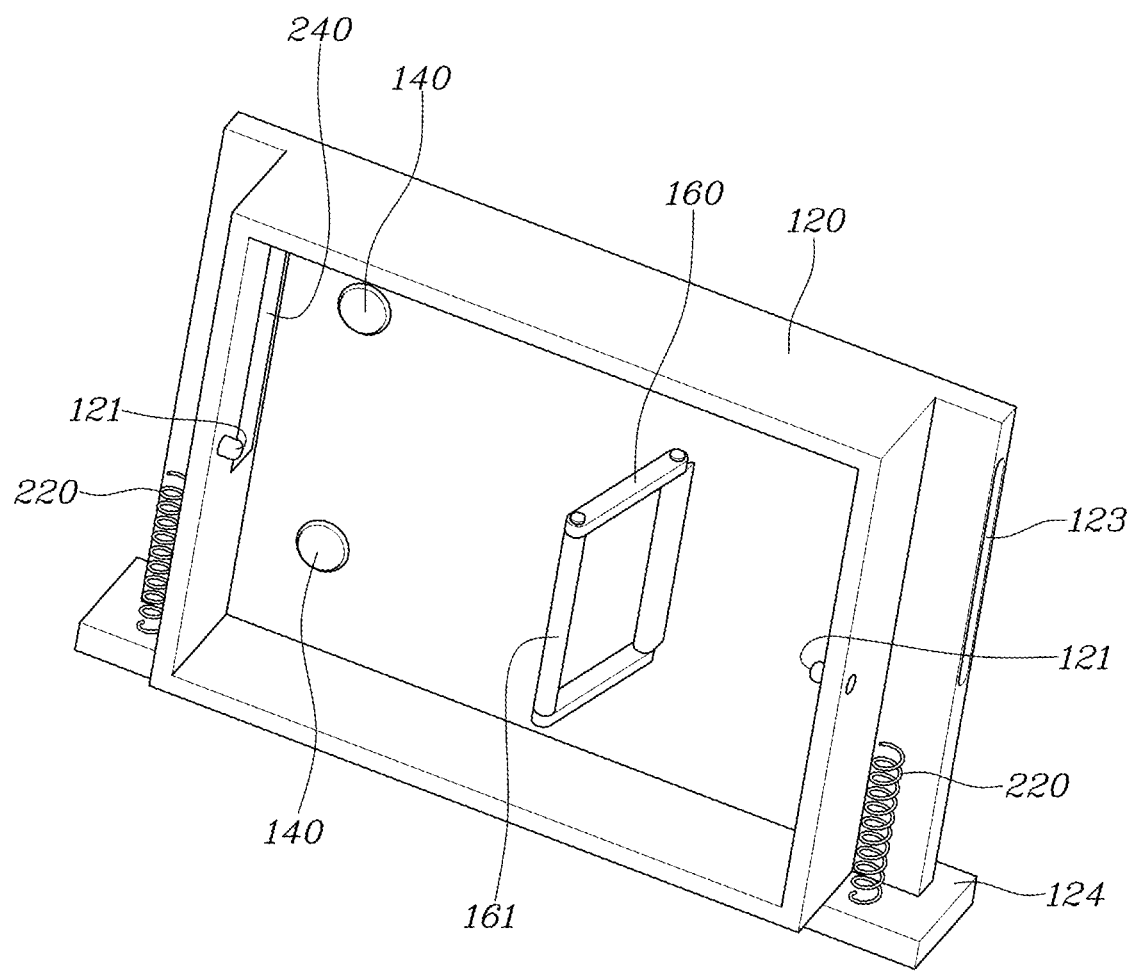
FIG. 9 is a bottom plan view of FIG. 7.
Figure 10:
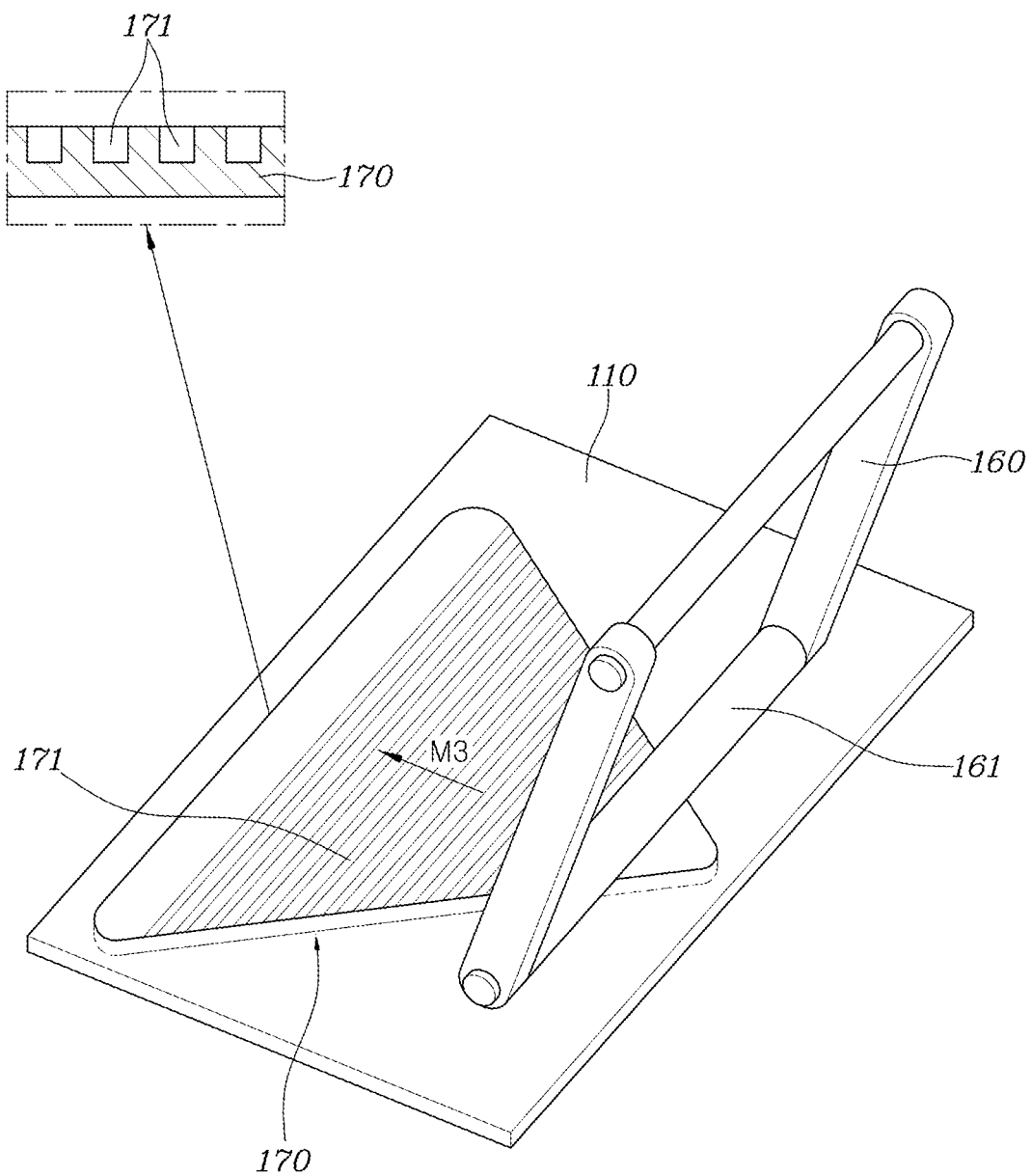
FIG. 10 is a view for explaining a pedal link and an operating characteristic implementing portion according to an exemplary embodiment of the present disclosure.

With reference to FIG. 4, a bottom surface 213 of the accelerator pedal 210 and a top surface 125 of the pedal stopper 124 may be equal in protruding height as L1. Alternatively, the bottom surface 213 of the accelerator pedal 210 may further protrude upward than the top surface 125 of the pedal stopper 124. Therefore, when the driver operates the accelerator pedal 210, the driver's foot 20 is not caught by the pedal stopper 124 so that safety and operation convenience may be improved at the time of operating the pedal.

Meanwhile, the electronic pedal apparatus according to an exemplary embodiment of the present disclosure may operate and move the accelerator pedal 210 and the brake pedal 120 in the direction of the base housing 110 (forward) in a state in which the accelerator pedal 210 is operated by being moved rightward by the driver.

That is, because the electronic pedal apparatus according to an exemplary embodiment of the present disclosure is configured so that the brake pedal module 100 and the accelerator pedal module 200 are stacked to form the single one-pedal 1, there may occur a situation in which the driver simultaneously operates the accelerator pedal 210 and the brake pedal 120 accidentally. In the instant case, pedal control may be performed to ignore the acceleration signal and preferentially adopt the brake signal to implement a braking function, ensuring safety against an erroneous operation.

As described above, according to the electronic pedal apparatus according to an exemplary embodiment of the present disclosure, the brake pedal module 100 and the accelerator pedal module 200 are vertically coupled in a stacked manner and form the single one-pedal 1 so that the pedal apparatus may be configured compactly as a whole, which provides advantages in reducing weight and costs and maximizing utilization of the internal space of the vehicle.

Furthermore, the driver may operate the electronic pedal apparatus according to an exemplary embodiment of the present disclosure with a small effort. The operation direction of the brake pedal 120 and the operation direction of the accelerator pedal 210 are different from each other, which provides advantages in preventing an erroneous operation and ensuring safety at the time of operating the pedal.

Furthermore, the electronic pedal apparatus according to an exemplary embodiment of the present disclosure implements the operating characteristics (operating feeling) by use of the rotary roller 161 of the pedal link 160 and the concave-convex portions 171 of the operating characteristic implementing portion 170 at the time of operating the brake pedal 120, which provides an advantage in enabling the driver to easily recognize an operation situation of the brake pedal 120.

Furthermore, according to the electronic pedal apparatus according to an exemplary embodiment of the present disclosure, as the stroke of the brake pedal 120 made by operation of the driver increases, the contact area between the rotary roller 161 and the concave-convex portions 171 gradually increases, and the operating characteristics (operating feeling) also gradually increases, which provides an advantage in enabling the driver to more easily recognize an operation amount of the brake pedal 120.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular form may also include a plural form. The expression "at least one (or one or more) of A, B, and C" may include one or more of all combinations that may be made by combining A, B, and C.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
a brake pedal module and an accelerator pedal module stacked and coupled to each other to form a single one-pedal,
wherein the one-pedal is provided on a vehicle body panel disposed below a driver seat, and
wherein the brake pedal module includes:
a base housing fixed to the vehicle body panel, and
a brake pedal stacked on the base housing and configured to be moved forward toward the base housing in response to a driver's operation thereof,
a first slot hole formed in a lateral surface of the base housing and extending in a movement direction of the brake pedal; and
a first stopper provided on a lateral surface of the brake pedal and inserted into the first slot hole so that a movement of the brake pedal is restricted by the first slot hole and the first stopper.

2. The electronic pedal apparatus of claim 1, wherein the brake pedal module is provided on the vehicle body panel, and the accelerator pedal module is stacked and coupled to an upper side of the brake pedal module to form the single one-pedal.

3. The electronic pedal apparatus of claim 1, wherein an operation direction in which the brake pedal module is operated in response to a driver's operation thereof is different from an operation direction in which the accelerator pedal module is operated in response to the driver's operation thereof.

4. The electronic pedal apparatus of claim 1, wherein the brake pedal module is operated in response to a driver's operation thereof in a forward and rearward direction together with the accelerator pedal module, and the accelerator pedal module is operated in a transverse direction in response that the driver operates the accelerator pedal module.

5. The electronic pedal apparatus of claim 1, wherein the brake pedal module further includes:
a brake pedal return spring including first and second opposite end portions connected to the base housing and the brake pedal, respectively and configured to return the brake pedal by moving the brake pedal in a direction, which is opposite to a direction in which the brake pedal is operated in response to the driver's operation thereof, when an operating force of the driver is removed from the brake pedal.

6. The electronic pedal apparatus of claim 5, wherein the brake pedal module further includes:
a pedal link rotatably coupled to the brake pedal; and
an operating characteristic implementing portion fixed to the base housing and provided to be in contact with the pedal link,
wherein the operating characteristic implementing portion includes concave-convex portions, which are contact portions with the pedal link, and configured to implement operating characteristics by contact between the pedal link and the concave-convex portions in response that the driver operates the brake pedal.

7. The electronic pedal apparatus of claim 6,
wherein the pedal link includes a rotary roller disposed on a portion provided to be in contact with the concave-convex portions, and
wherein one of the rotary roller and the concave-convex portions includes a magnet, and another of the rotary roller and the concave-convex portions includes a metal member so that the operating characteristics are implemented by an attractive force between the magnet and the metal member in response that the driver operates the brake pedal.

8. The electronic pedal apparatus of claim 6,
wherein the pedal link includes a rotary roller disposed on a portion provided to be in contact with the concave-convex portions, and
wherein the rotary roller and the concave-convex portions are configured as magnets including different polarities so that the operating characteristics are implemented by an attractive force between the magnets including the different polarities in response that the driver operates the brake pedal.

9. The electronic pedal apparatus of claim 6,
wherein the pedal link includes a rotary roller disposed on a portion provided to be in contact with the concave-convex portions, and
wherein the rotary roller and the concave-convex portions include magnets including a same polarity so that the operating characteristics are implemented by a repulsive force between the magnets including the same polarity in response that the driver operates the brake pedal.

10. The electronic pedal apparatus of claim 6,
wherein the pedal link includes a rotary roller disposed on a portion provided to be in contact with the concave-convex portions, and
wherein a contact area of the concave-convex portions with the rotary roller increases as a stroke of the brake pedal made by operation of the driver increases.

11. The electronic pedal apparatus of claim 6, wherein the concave-convex portions extend leftward and rightward and are configured continuously in a movement direction of the pedal link.

12. An electronic pedal apparatus comprising:
a brake pedal module and an accelerator pedal module stacked and coupled to each other to form a single one-pedal, wherein the one-pedal is provided on a vehicle body panel disposed below a driver seat, wherein the brake pedal module includes:
  a base housing fixed to the vehicle body panel, and
  a brake pedal stacked on the base housing and configured to be moved forward toward the base housing in response to a driver's operation thereof, and
wherein the accelerator pedal module includes:
  an accelerator pedal stacked on the brake pedal and configured to move in a transverse direction relative to the brake pedal in response that the driver operates the accelerator pedal; and
  an accelerator pedal return spring including first and second opposite end portions connected to the brake pedal and the accelerator pedal, respectively and configured to return the accelerator pedal by moving the accelerator pedal in a direction, which is opposite to a direction in which the accelerator pedal is operated by the driver, in response that an operating force of the driver is removed from the accelerator pedal.

13. The electronic pedal apparatus of claim 12, further including:
  a second slot hole formed in a lateral surface of the brake pedal and extending leftward and rightward in a movement direction of the accelerator pedal; and
  a second stopper provided on a lateral surface of the accelerator pedal and inserted into the second slot hole so that a movement of the accelerator pedal is restricted by the second slot hole and the second stopper.

14. The electronic pedal apparatus of claim 12, wherein the accelerator pedal module includes:
  a second permanent magnet coupled to the accelerator pedal; and
  a second printed circuit board (PCB) provided on the brake pedal to face the second permanent magnet and configured to detect a change in magnetic flux and generate a signal related to a pedal function in response that a position of the second permanent magnet is changed by a movement of the accelerator pedal.

15. The electronic pedal apparatus of claim 12, wherein the accelerator pedal includes a pedal guide protruding and configured to come into contact with the driver's foot and transmit an operating force.

16. The electronic pedal apparatus of claim 12, wherein a pedal stopper protrudes from the brake pedal, and the accelerator pedal, which is returned by an elastic force of the accelerator pedal return spring, comes into contact with the pedal stopper so that a return position of the accelerator pedal is restricted.

17. The electronic pedal apparatus of claim 16, wherein a bottom surface of the accelerator pedal and a top surface of the pedal stopper are equal to each other in protruding height, or the bottom surface of the accelerator pedal further protrudes than the top surface of the pedal stopper.

18. The electronic pedal apparatus of claim 12, wherein when the driver operates and moves the accelerator pedal and the brake pedal in a direction of the base housing in a state in which the accelerator pedal is operated by being moved in the transverse direction by the driver, an acceleration signal is ignored, and a brake signal is adopted to implement a braking function.

19. An electronic pedal apparatus comprising:
  a brake pedal module and an accelerator pedal module stacked and coupled to each other to form a single one-pedal, wherein the one-pedal is provided on a vehicle body panel disposed below a driver seat,
  wherein the brake pedal module includes:
    a base housing fixed to the vehicle body panel,
    a brake pedal stacked on the base housing and configured to be moved forward toward the base housing in response to a driver's operation thereof,
    a first permanent magnet coupled to the brake pedal; and
    a first printed circuit board (PCB) provided in the base housing to face the first permanent magnet and configured to detect a change in magnetic flux and generate a signal related to a pedal function when a position of the first permanent magnet is changed by a movement of the brake pedal.

20. The electronic pedal apparatus of claim 19, wherein the brake pedal module further includes:
  a brake pedal return spring including first and second opposite end portions connected to the base housing and the brake pedal, respectively and configured to return the brake pedal by moving the brake pedal in a direction, which is opposite to a direction in which the brake pedal is operated in response to the driver's operation thereof, when an operating force of the driver is removed from the brake pedal.

\* \* \* \* \*